United States Patent
Shimada et al.

(10) Patent No.: US 6,563,634 B2
(45) Date of Patent: May 13, 2003

(54) MICROSCOPE WITH ABERRATION CORRECTING FUNCTION

(75) Inventors: Masakazu Shimada, Nishinomiya (JP); Yoshihiro Shimada, Sagamihara (JP); Hisao Kitagawa, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 1 day.

(21) Appl. No.: 09/951,871

(22) Filed: Sep. 13, 2001

(65) Prior Publication Data

US 2002/0036823 A1 Mar. 28, 2002

(30) Foreign Application Priority Data

Sep. 22, 2000 (JP) .......... 2000-289470
Aug. 9, 2001 (JP) .......... 2001-242632

(51) Int. Cl.[7] ........................ G02B 21/00
(52) U.S. Cl. .............. 359/368; 359/379; 359/392
(58) Field of Search .................. 359/368, 379, 359/381, 396, 398, 391, 392

(56) References Cited

U.S. PATENT DOCUMENTS 4,989,957 A * 2/1991 Suzuki ............ 359/656
5,398,064 A * 3/1995 Saka ............ 348/347
5,978,155 A * 11/1999 Suenaga ............ 359/691
6,473,228 B1 * 10/2002 Toshimitsu ............ 359/368

FOREIGN PATENT DOCUMENTS

| JP | 5-119263 | 5/1993 |
| JP | 8-114747 | 5/1996 |
| JP | 9-127403 | 5/1997 |

* cited by examiner

Primary Examiner—Mark A. Robinson
(74) Attorney, Agent, or Firm—Frishauf, Holtz, Goodman & Chick, P.C.

(57) ABSTRACT

A microscope according to the invention comprises an aberration correcting objective lens facing a specimen and having an aberration correcting lens correcting an aberration due to an error in the thickness of a cover, a Petri dish or a slide glass; a moving amount detector detecting moving amount of the aberration correcting lens; a focusing unit moving the specimen; a driver unit driving the focusing unit; and an arithmetic unit obtaining a defocus amount based on a moving amount detected by the moving amount detector. When the aberration correcting lens is moved, the specimen is put out of focus. On the basis of a defocus amount obtained by the arithmetic unit, the driver unit drives the focusing unit so that the lens may focus on the specimen.

5 Claims, 5 Drawing Sheets

MICROSCOPE WITH ABERRATION CORRECTING FUNCTION

CROSS-REFERENCE TO RELATED APPLICATIONS

This application is based upon and claims the benefit of priority from the prior Japanese Patent Application No. 2000-289470, filed Sep. 22, 2000; and No. 2001-242632, filed Aug. 9, 2001, the entire contents of both of which are incorporated herein by reference.

BACKGROUND OF THE INVENTION

The present invention relates to a microscope provided with an objective lens having a function of correcting an aberration due to an error in the thickness of a cover glass or in the thickness of a member with transmittivity holding a specimen, for example, a Petri dish or a slide glass.

Recently, the main focus in the field of biology has been shifting from the conventional observation of cells to the investigation of mechanisms of information transfer between cells. This trend has highlighted the need for higher performance microscopes and objective lenses.

Generally, an objective lens used in a microscope is designed on the premise that the thickness of a plane-parallel plate such as a cover glass is constant. Accordingly, if the thickness of a cover glass etc. fluctuates greatly, outside the design tolerance, the image forming performance of the objective lens is deteriorated. This tendency is more pronounced in high-performance objective lenses that have larger numerical apertures.

Furthermore, the image forming performance of the objective lens is deteriorated by an error in the thickness of a member with transmittivity holding a specimen such as a Petri dish or a slide glass often used in the observation under an inverted microscope.

To guard against it, a so-called correcting ring-fitted objective lens has been made available which corrects the aberrations by changing a distance between a plurality of lenses mounted in an objective lens corresponding to a change in the thickness of a cover glass or in the thickness of a member with transmittivity such as a Petri dish and slide glass, as disclosed in Jpn. Pat. Appln. KOKAI Publication Nos. 5-119263 and 8-114747.

The above-mentioned publications employ a method of correcting aberrations due to an error in the thickness of a cover glass by moving along an optical axis a group of aberration correcting lenses in an objective lens.

To correct an aberration of the cover glass thickness in observation using a microscope, after a specimen comes into focus, the correcting ring of the objective lens is turned so as to improve the resolution. When the aberration is thus corrected, however, the specimen goes out of focus and so must be focused again, thus leading to the problem of much labor being required.

BRIEF SUMMARY OF THE INVENTION

It is an object of the present invention to provide a microscope which can hold a specimen in focus even when an objective lens thereof is corrected in terms of aberration.

To achieve this object, the microscope according to the present invention comprises:

an aberration correcting objective lens facing a specimen and having a movable aberration correcting lens correcting an aberration due to an error in the thickness of a cover glass covering the specimen and a specimen-holding member with transmittivity holding the specimen;

a moving amount detector detecting a moving amount by which the aberration correcting lens moves along an optical axis of the aberration correcting lens;

focusing unit changing a distance between the specimen and the aberration correcting objective lens;

a driver unit driving the focusing unit; and an arithmetic unit obtaining a defocus amount of the aberration correcting objective lens based on a moving amount detected by the moving amount detector. In such a configuration, when the aberration correcting lens has moved, the specimen is put out of focus of the aberration correcting objective lens. Then, the driver unit drives the focusing unit so as to focus the aberration correcting objective lens, based on a defocus amount obtained by the arithmetic unit.

When correcting an error in the thickness of a cover glass or thickness of a specimen-holding member with transmittivity such as a Petri dish or a slide glass, a defocus amount is obtained which is related to a moving amount of the aberration correcting lens detected by the moving amount detector. The focusing unit changes the distance between the specimen and the aberration correcting objective lens by this defocus amount. This enables proper focusing even when the aberration correcting lens is moved to correct an aberration.

Furthermore, the microscope according to the present invention comprises:

an aberration correcting objective lens facing a specimen and having a movable aberration correcting lens correcting an aberration due to an error in the thickness of a cover glass covering the specimen or a specimen-holding member with transmittivity holding the specimen;

a moving unit moving the aberration correcting lens along an optical axis of the aberration correcting lens;

a focusing unit changing a distance between the specimen and the aberration correcting objective lens;

a driver unit driving the focusing unit; and an arithmetic unit obtaining a defocus amount of the aberration correcting objective lens based on a moving amount by which the aberration correcting lens is moved by the moving unit. In this configuration, when the aberration correcting lens is moved, the specimen is put out of focus of the aberration correcting objective lens. The driver unit then drives the focusing unit so as to properly focus the aberration correcting objective lens, based on a defocus amount obtained by the arithmetic unit.

When correcting an error in the thickness of a cover glass or the thickness of a specimen-holding member with transmittivity such as a Petri dish or a slide glass, a defocus amount is obtained which is related to a moving amount by which the aberration correcting lens is moved by the moving unit. The focusing unit changes the distance between the specimen and the aberration correcting objective lens by this defocus amount. This enables proper focusing even when the aberration correcting lens is moved to correct an aberration.

Furthermore, the microscope according to the present invention comprises:

a state placing thereon a specimen which is covered by a cover glass or held in a specimen-holding member with transmittivity;

an aberration correcting objective lens facing the above-mentioned stage and having an aberration correcting unit correcting an aberration due to an error in the thickness of the above-mentioned cover glass or specimen-holding member;

a focusing unit changing a distance between the above-mentioned stage and the above-mentioned aberration-collecting objective lens;

an optical observation system leading the light from the above-mentioned specimen that has passed through the above-mentioned aberration correcting objective lens, to form an observed image of the specimen; and a processor section controlling the above-mentioned focusing unit so as to focus the above-mentioned aberration correcting objective lens. In this configuration, when the above-mentioned aberration correcting unit has corrected an aberration, the specimen is put out of focus of the above-mentioned aberration correcting objective lens. Then, the above-mentioned processor section controls the above-mentioned focusing unit so that the above-mentioned aberration correcting objective lens may focus on the specimen.

Defocusing occurs if the aberration correcting lens is moved to correct an error in the thickness of the cover glass or the thickness of the specimen-holding member with transmittivity such as a Petri dish or a slide glass. The microscope according to the present invention is provided with the processor section controlling the focusing unit so that the specimen may be put in focus, thus modifying a defocus due to the movement of the aberration correcting lens. By utilizing those abilities of modification of a defocus and movement of the aberration correcting lens, it is possible to find an optimal focal point and also to realize an observation state in which such an aberration has been corrected that is caused by an error in the cover glass thickness.

In the microscope according to the present invention, the above-mentioned aberration correcting objective lens has an objective lens body. The above-mentioned aberration correcting unit has an aberration correcting lens movably attached to the objective lens body. The microscope according to the present invention further comprises:

a moving unit moving the above-mentioned aberration correcting lens;

a photo-detector with a light-receiving plane detecting a light incident upon this light-receiving plane; and an optical detector system leading onto the above-mentioned light-receiving plane of the above-mentioned photo-detector the light from the above-mentioned specimen that has passed trough the above-mentioned aberration correcting objective lens. In this configuration, the above-mentioned processor section obtains a contrast of an image of the above-mentioned specimen formed on the above-mentioned light-receiving plane from the light detected by the above-mentioned photo-detector and, based on this contrast, controls the above-mentioned moving unit and focusing unit. As a result, the above-mentioned aberration correcting objective lens is well focused on the specimen, thereby correcting an aberration of the observed image.

A defocus due to the movement of the aberration correcting lens can be modified by changing the distance between the stage and the objective lens by as much as a predetermined amount (defocus amount). In the microscope according to the present invention, the above-mentioned processor section obtains a contrast of an image of the specimen formed on the light-receiving plane. Based on this contrast, the processor section calculates, for example, a defocus amount. Based on this defocus amount, the processor section controls the moving unit and the focusing unit. As a result, an optimal focus position can be found and also an observation state can be realized in which an aberration due to an error in the cover glass thickness has been corrected.

The microscope according to the present invention further comprises:

at least one regular objective lens; and an objective-lens selector mechanism selectively setting a first state in which the above-mentioned aberration correcting objective lens faces the above-mentioned stage and the regular objective lens is placed far away from the above-mentioned stage and a second state in which the above-mentioned aberration correcting objective lens is placed far away from the above-mentioned stage and one of the regular objective lenses faces the above-mentioned stage.

When the regular objective lens is facing the stage, the lens is focused with the aberration of an observed image as uncorrected. If the aberration correcting objective lens is facing the stage, on the other hand, the lens is focused with the aberration of the observed image as corrected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
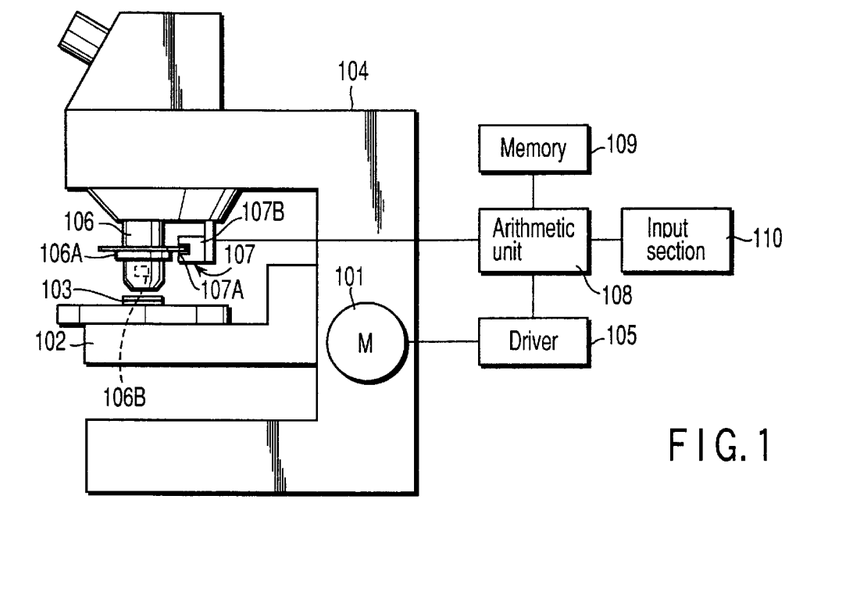
FIG. 1 is an illustration for showing a configuration of an erecting microscope related to a first embodiment of the present invention.

The following will describe an erecting microscope related to a first embodiment of the present invention with reference to FIG. 1. A specimen 103 covered by a cover glass is placed on a stage 102 moved along an optical axis by a power focusing unit 101. A slide glass is located between the stage 102 and the specimen 103. The power focusing unit 101 is attached to a microscope body 104 and controlled in drive by a driver 105 used as a driver unit.

Furthermore, on the microscope body 104 is attached an aberration correcting objective lens 106 having a correcting ring 106A facing the specimen 103. The aberration correcting objective lens 106 has a movable aberration correcting lens 106B. The aberration collecting lens 106B moves when the correcting ring 106A is rotated. A moving amount of the aberration correcting lens 106B corresponds to a rotation amount of the correcting ring 106A. To detect the rotation amount of the correcting ring 106A, an encoder 107 is provided which is comprised of a disk 107A and a sensor 107B. The encoder 107 is used as a moving amount detector. The disk 107A is attached to the correcting ring 106A and the sensor 107B, to the microscope body 104.

When an observer rotates the correcting ring 106A (by hand) to correct an aberration, an arithmetic unit 108 receives from the encoder 107 a signal corresponding to a rotation amount of the correcting ring 106A and, based on the thus received rotation amount of the correcting ring 106A indicated by the signal, calculates a defocus amount, described later, of the aberration correcting objective lens 106 and then sends it to the driver 105. Specifically, the arithmetic unit 108 calculates the defocus amount based on a correlation, stored beforehand in a memory 109 by an input section 110, between the rotation amount of the correcting ring 106A and the defocus amount of the objective lens 106. Then, based on the signal indicating the defocus amount sent via the driver 105 from the arithmetic unit 108, the power focusing unit 101 is driven to move the stage 102 along the optical axis.

Figure 2A:
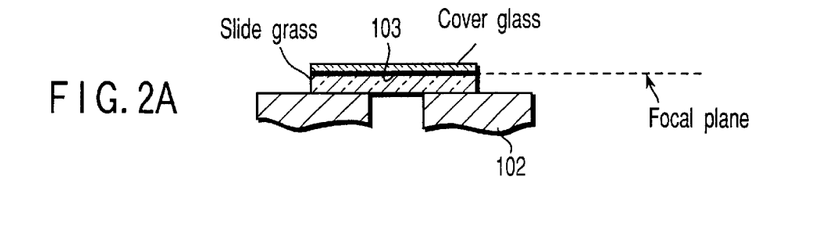
FIGS. 2A, 2B, and 2C are cross-sectional view for showing a focusing procedure of the microscope related to the first embodiment.
Figures 2B, 2C:
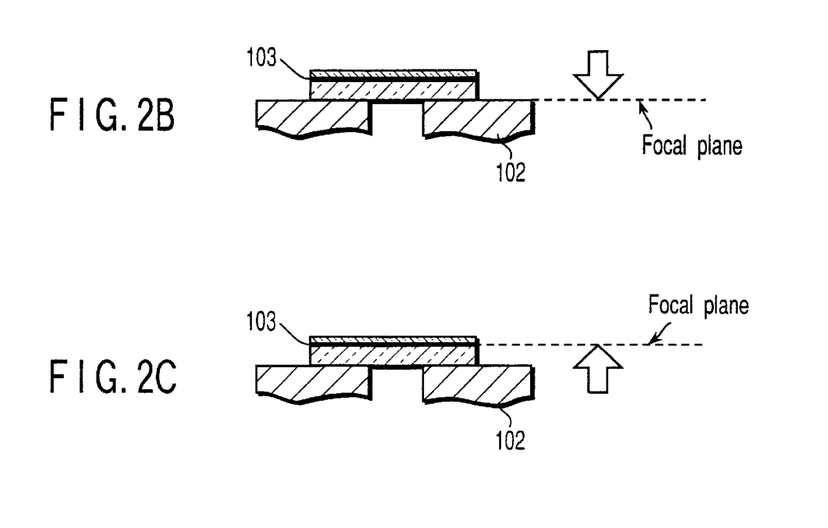

FIGS. 2A, 2B, and 2C are cross-sectional view for showing a focusing procedure in this first embodiment. First, as shown in FIG. 2A, the observer moves the stage 102 to thereby match the specimen 103 with a focal plane. This causes the aberration correcting objective lens 106 to focus on the specimen 103.

Then, as shown in FIG. 2B, the observer rotates the correcting ring 106A (by hand) in order to correct an aberration due to an error in the thickness of the cover glass for the specimen 103. This causes the focal plane to be offset from the specimen 103 in the direction of the arrow. That is, the specimen 103 is defocused from the aberration correcting objective lens 106. A distance between the focal plane and the specimen 103 at this point in time provides a defocus amount.

In this step, the arithmetic unit 108 receives from the encoder 107 a signal which corresponds to a rotation amount of the correcting ring 106A. The arithmetic unit 108 calculates the defocus amount based on a correlation, stored in the memory 109, between the rotation amount of the correcting ring 106A and the defocus amount of the objective lens 106. The arithmetic unit 108 causes the driver 105 to drive in control the power focusing unit 101 to move the stage 102, in correspondence with the thus calculated defocus amount. As a result, as shown in FIG. 2C, the stage 102 moves in such a direction (arrow direction) to be in focus.

When the distance between the specimen 103 and the aberration correcting objective lens 106 changes by as much as the defocus amount, the aberration correcting objective lens 106 focuses on the specimen 103. By such operations of the microscope, the task of focusing after aberration correction is rendered unnecessary.

Figure 3:
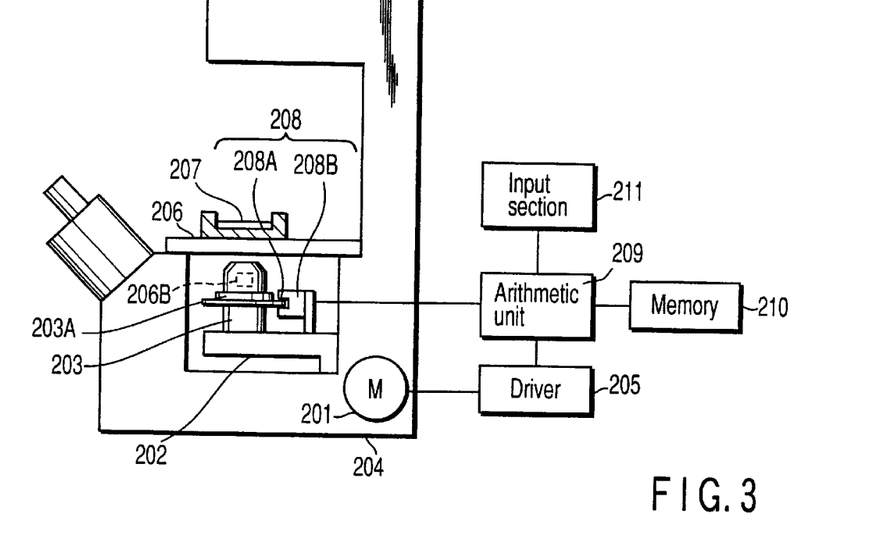
FIG. 3 is an illustration for showing a configuration of an inverted microscope related to a second embodiment of the present invention.

The following will describe an inverted microscope related to a second embodiment of the present invention with reference to FIG. 3. An aberration correcting objective lens 203 is attached to an objective-lens attaching portion 202 moved by a power focusing unit 201 along an optical axis. The power focusing unit 201 is attached to the microscope body 204 and driven in control by a driver 205 used as the driver unit. On a stage 206 of the microscope body 204 is placed a specimen 207 held in a specimen-holding member with transmittivity, that is, a Petri dish. Note here that a slide glass may be used as a specimen-holding member, instead of the Petri dish. The aberration correcting objective lens 203 faces the specimen 207.

The aberration correcting objective lens 203 has a correcting ring 203A and a movable aberration correcting lens 106B. To detect a rotation amount of the correcting ring 203A, an encoder 208 is provided which is comprised of a disk 208A and a sensor 208B. The encoder 208 is used as a moving amount detector. The disk 208A is attached to the correcting ring 203A and the sensor 208B, to the microscope body 204.

When the observer rotates the correcting ring 203A by hand to correct an aberration, an arithmetic unit 209 receives from the encoder 208 a signal which corresponds to a rotation amount of the correcting ring 203A. The arithmetic unit 209 calculates a defocus amount from the rotation amount indicated by this signal and sends a signal to the driver 205. Specifically, the arithmetic unit 209 calculates the defocus amount based on a correlation, stored beforehand in a memory 210 by an input section 211, between the rotation amount of the correcting ring 203A and the defocus amount of the aberration correcting objective lens 203. Then, the aberration correcting objective lens 203 moves along the optical axis when the power focusing unit 203 is driven based on the signal indicative of the defocus amount sent via the driver 205 from the arithmetic unit 209.

According to this second embodiment, the observer puts the specimen 207 in focus and then rotates the correcting ring 203A by hand to correct an aberration based on an error in the thickness of the Petri dish (slide glass) in which the specimen 207 is held. The encoder 208 sends to the arithmetic unit 209 a signal which corresponds to a rotation amount of the correcting ring 203A. The arithmetic unit 209, having received the signal, controls the power focusing unit 201 via the driver 205. As a result, the aberration correcting objective lens 203 moves in the focusing direction in which the objective lens 203 may focus on the specimen 207. By such operations of the microscope, the task of focusing after aberration correction is rendered unnecessary.

Figure 4:
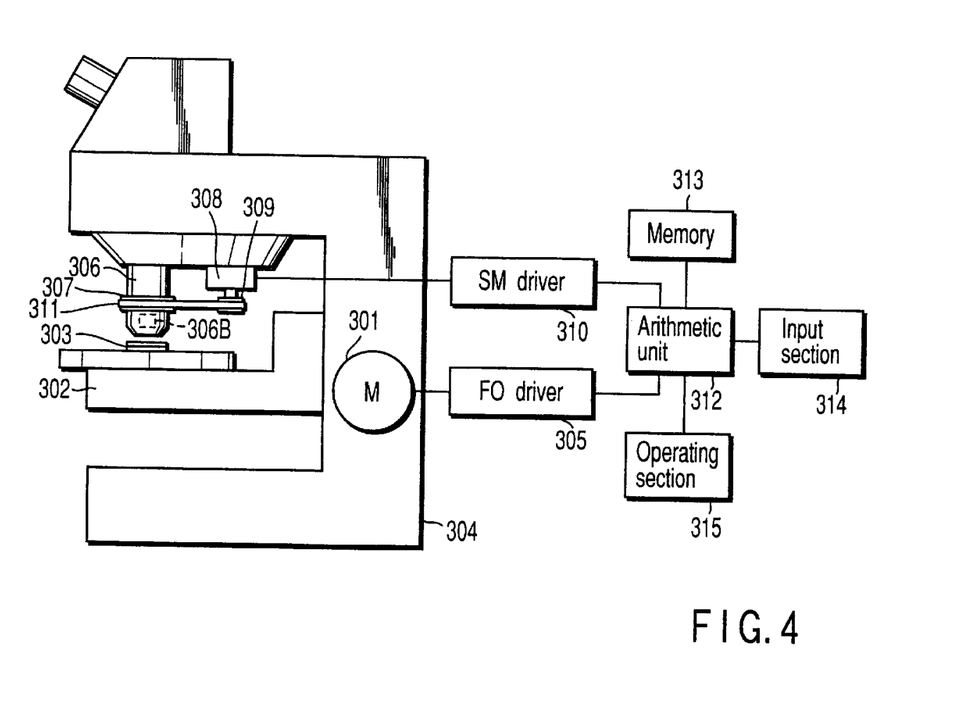
FIG. 4 is an illustration for showing a configuration of an erecting microscope related to a third embodiment of the present invention.

The following will describe an erecting microscope related to a third embodiment of the present invention with reference to FIG. 4. On a stage 302 moved along an optical axis by a power focusing unit 301 is placed a specimen 303 covered by a cover glass. A slide glass is located between the stage 302 and the specimen 303. The power focusing unit 301 is attached to a microscope body 304 and driven in control by an FO driver 305 used as the driver unit.

Furthermore, to the microscope body 304 is attached an aberration correcting objective lens 306 in such a manner so as to face the specimen 303. The aberration correcting objective lens 306 has a movable aberration correcting lens 106B. The correcting ring (not shown) provided for the aberration correcting objective lens 306 is mounted with a pulley 307 and a stepping motor 308 for rotating the correcting ring is mounted on its shaft with a pulley 309. The stepping motor 308 is used as a moving unit. The stepping motor 308 is attached to the microscope body 304 and driven in control by an SM driver 310. Over the pulleys 307 and 309 is stretched a belt 311. The observer can operate an operating section 315 connected to an arithmetic unit 312 to thereby send to the arithmetic unit 312 an instruction for rotating the correcting ring. This instruction is specifically performed by, for example, inputting a rotation amount of the correcting ring to the operating section 315. When given the instruction, the arithmetic unit 312 sends to the SM driver 310 a signal for rotating the stepping motor 208. When the stepping motor 308 rotates, its rotating force is transferred via the pulleys 307 and 309 to the correcting ring to thereby rotate it.

When having received from the operating section 315 the signal for correcting an aberration of the aberration correcting objective lens 306, the arithmetic unit 312 calculates, based on this signal, a defocus amount of the aberration correcting objective lens 306 caused by the rotation of the stepping motor 308. Specifically, the arithmetic unit 312 calculates the defocus amount based on a correlation, stored beforehand in a memory 313 by an input section 314, between the rotation amount of the correcting ring and the defocus amount of the objective lens 306. Then, the aberration correcting objective lens 306 moves along the optical axis when the power focusing unit 301 is driven based on the signal indicating the defocus amount sent from the FO driver 305.

According to this third embodiment, after the specimen 303 is put in focus, the observer sends to the arithmetic unit 312 an instruction for rotating the correcting ring, in order to correct an error in the thickness of the cover glass for the specimen 303. The instruction is specifically performed by, for example, inputting a rotation amount of the correcting ring. Based on this thus input rotation amount, the aberration correcting objective lens 306 moves along the optical axis so that the objective lens 306 may focus on the specimen 303. Therefore, the task of focusing after aberration correction is rendered unnecessary.

Note here that the mechanism for rotating the correcting ring is not limited to a stepping motor and a belt. Any mechanism may be used as long as it can drive the correcting ring by power and recognize a drive amount of the correcting ring to obtain the same effects, for example, a rotary gear or a rack-and-pinion mechanism. Moreover, the configuration according to this third embodiment may be applied to the body of an inverted microscope to obtain the same effects.

Figure 5:
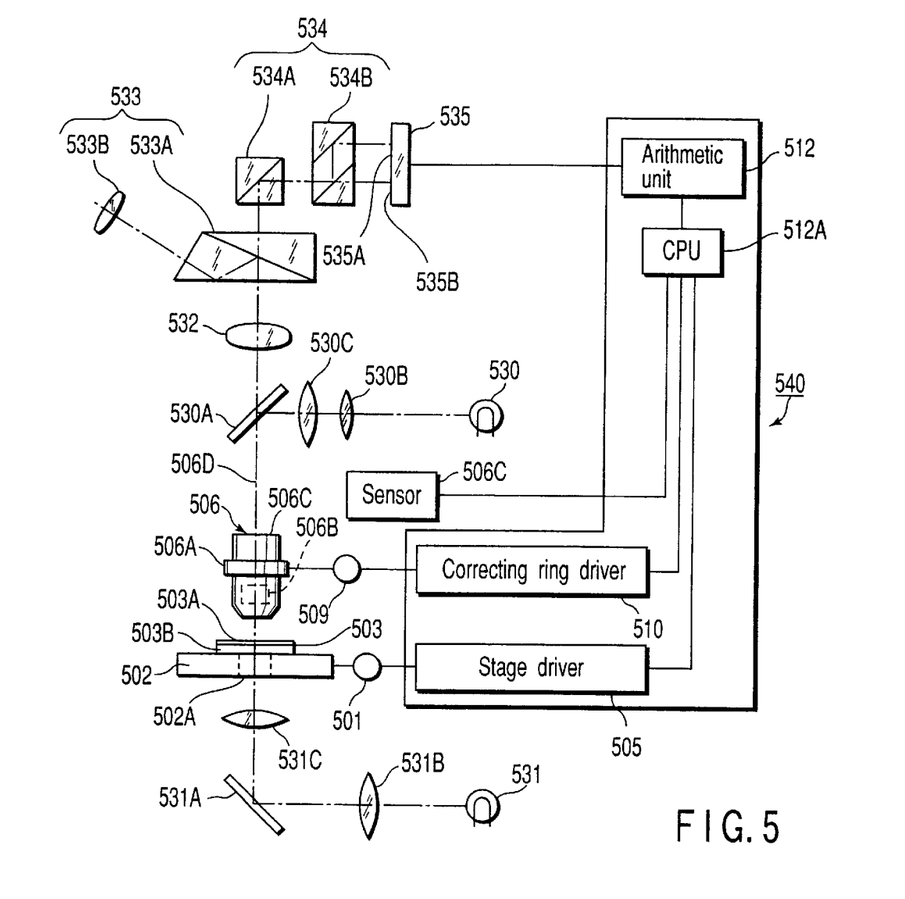
FIG. 5 is an illustration for showing a configuration of an erecting microscope related to fourth and fifth embodiments of the present invention.

The following will describe an erecting microscope related to a fourth embodiment of the present invention with reference to FIG. 5. A specimen 503 to be observed is placed on a stage 502. The specimen 503 is covered by a cover glass 503A. A slide glass 503B is located between the stage 502 and the specimen 503. Note here that the specimen 503 may be held in a specimen-holding member with transmittivity, for example, a Petri dish, instead of the cover glass 503A.

An aberration correcting objective lens 506 is provided facing the stage 502. The aberration correcting objective lens 506 has an aberration correcting unit for correcting an error in the thickness of the cover glass 503A. If the specimen-holding member is used instead, an error in its thickness is corrected. The objective lens 506 has an objective lens body 506C, in which is movably mounted an aberration correcting lens 506B. The aberration correcting lens 506B is used as an aberration correcting unit. When a correcting ring 506A fitted to the objective lens 506 is rotated, the aberration correcting lens 506B moves along the optical axis of the aberration correcting lens 506B to correct an error in the thickness of the cover glass 503A.

On the stage 502 is provided a power focusing unit 501 which moves the stage 502 vertically in order to change a distance between the stage 502 and the objective lens 506. The power focusing unit 501 is used as a focusing unit. Note here that the power focusing unit 501 may not move the stage 502 to move the objective lens 506 or both of them instead.

The microscope is provided with a stepping motor 509 for rotating the correcting ring 506A of the objective lens 506. The stepping motor 509 is used as a moving unit. As in the case of the third embodiment, the correcting ring 506A of the objective lens 506 is rotated via a pulley and a belt (not shown) by the stepping motor 509. Note here that the moving unit may be anything as long as it gives almost the same effects.

In an optical system of the microscope are disposed a downward-illuminating light source 530 which illuminates the specimen 503 on the stage 502 from above in the same way as a downward-illumination speculum, and a transmission light source 531 which illuminates the specimen 503 from below in the same way as a transmission speculum. A downward-illuminating light from the downward-illuminating light source 530 is reflected toward the specimen 503 by a half-mirror 530A disposed on an observation optical axis 506D. Prior to this reflection, the downward-illuminating light passes through between two lenses 530B and 530C. The observation optical axis 506D extends from the objective lens 506 up to an optical observation system 533 described later. The reflected downward-illuminating light passes through the objective lens 506 to then be made incident upon the specimen 503.

A transmitting illumination light from the transmission light source 531, on the other hand, is reflected toward the specimen 503 by a mirror 531A disposed below the stage 502 and passes through an optical-path opening 502A formed in the stage 502 to then illuminate the specimen 503 upwards. On the optical path of this transmitting illumination light are disposed two lenses 531B and 531C.

A light from the specimen 503 obtained from either of these two light sources 530 and 531 passes through the half-mirror 530A and an image forming lens 532 and is made incident upon an optical-path branching member 533A. This incident light is split into two light beams, one of which branches to an eyepiece lens 533B and the other, to an optical detecting system 534 described later. The optical-path branching member 533A and the eyepiece lens 533B are combined to form the optical observation system 533. The optical observation system 533 leads the light from the specimen 503 that has passed through the objective lens 506, to thereby form an observed image of the specimen 503.

The optical detecting system 534 has a mirror 534A deflecting a light made incident upon the optical detecting system 534 and a splitting prism 534B splitting the deflected light into two light beams. Facing the splitting prism 543B is provided a CCD sensor 535. The CDD sensor 535 is used as a photo-detector. The CCD sensor 535 has two light-receiving planes 535A and 535B to thereby detect light made incident upon these planes. Two light beams from the splitting prism 534B go through two different optical paths, which lead to the two light-receiving planes 535A and 535B of the CCD sensor 535. Thus, the optical detecting system 534 leads the light from the specimen 503 which has passed through the objective lens 506 onto the light-receiving planes 535A and 535B of the CCD sensor 535.

The splitting prism 534B utilizes the difference of the number of times of reflections inside the splitting prism 534B to thereby make different from each other the lengths of the two optical paths which extend from an image forming lens 532 to the two light-receiving planes 535A and 535B. The light-receiving planes 535A and 535B of the CCD sensor 535 match optically conjugate positions (front-side conjugate face and rear-side conjugate face) in front of and behind an expected image-formation plane of an optical image-formation system comprised of the image forming lens 532 and the optical detecting system 534. This causes images (pre-focusing image and post-focusing image) of the specimen 503 to be projected from the expected image-formation plane to two conjugate positions on the light-receiving planes 535A and 535B of the CCD sensor 535 respectively.

Figure 6:
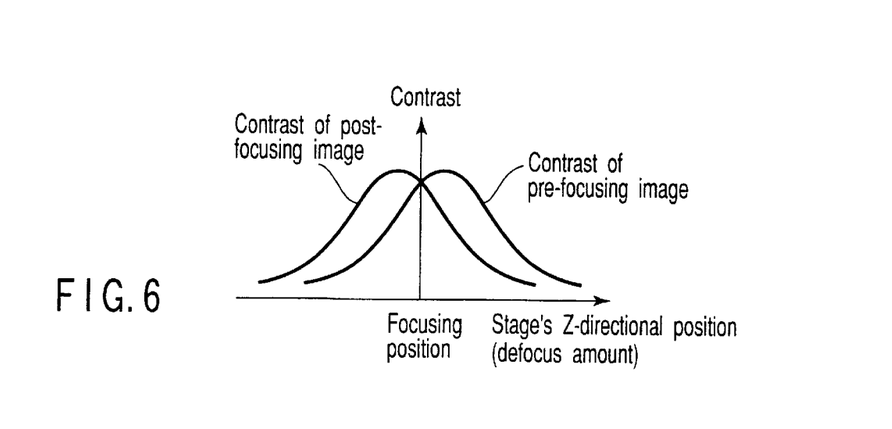
FIG. 6 is a graph for indicating contrasts of a pre-focusing image and a post-focusing image versus a vertical position (Z-directional position) of a stage in the fourth embodiment of the present invention.

FIG. 6 is a graph for indicating the contrast of the pre-focusing image and the post-focusing image versus a vertical (Z-directional) position of the stage 502. The contrasts of those two images are equal to each other when the stage 502 is positioned at a focusing position. Based on a difference between those two contrasts is calculated a defocus amount (displacement of the stage 502 with respect to the focusing position) indicating a degree of focusing on the specimen 503 by an arithmetic unit 512 connected to the CCD sensor 535. A signal indicative of that defocus amount is input to a CPU512A. The CPU512A, when having received the defocus signal from the arithmetic unit 512, calculates a signal indicating a moving amount and a moving direction of the stage 502 for moving the stage 502 to the focusing position. Then, based on this signal the stage 502 is moved vertically via the stage driver 505 by the power focusing unit 501. The arithmetic unit 512, the CPU512A, and the stage driver 505 are contained in a processor section 540. Thus, the processor section 540 controls the power focusing unit 501 so that the objective lens 506 may focus on the specimen 503 (optical-axial focusing adjustment). With this, the observed image formed by the optical observation system 533 is put in focus.

The CPU512A can output a signal to a correcting-ring driver 510 interposed between the CPU512A and the stepping motor 509 to thereby cause the stepping motor 509 to rotate the correcting ring 506A. The correcting-ring driver 510 is contained in the processor section 540. The correcting ring 506A is provided with the sensor 506C detecting a rotation position of the correcting ring 506A. As the censor 506C, something similar to the encoder 107 described with the first embodiment may be used.

Figure 7:
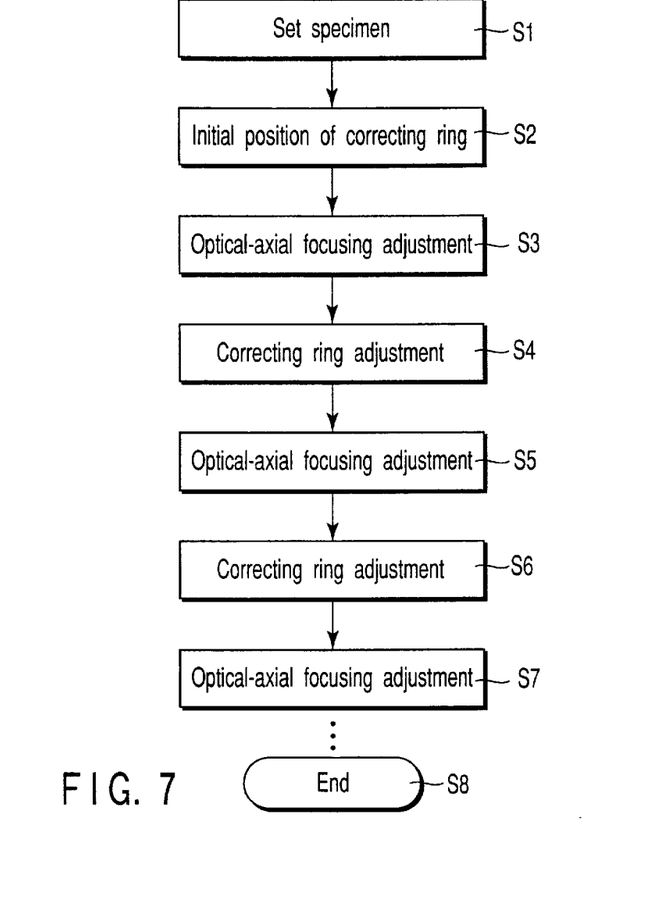
FIG. 7 is a flowchart for showing a correcting method according to the fourth embodiment of the present invention.

A method is described below for permitting the correcting ring 506A of the objective lens 506 to correct an error in the thickness of the cover glass 503A. FIG. 7 is a flowchart explaining this correcting method. First, on the stage 502 is set the specimen 503 and the cover glass 503A (S1).

Next, the CPU512A causes the stepping motor 509 to rotate the correcting ring 506A to its initial position (S2).

When the correcting ring 506A has reached the initial position, the above-mentioned optical-axial focusing adjustment is performed (S3).

Next, the CPU512A causes the stepping motor 509 to rotate the correcting ring 506A by a predetermined amount (correcting ring adjustment, S4). When the correcting ring 506A has thus been rotated, the aberration correcting lens 506B in the objective lens 506 moves, thus giving rise to an optical-axial defocus.

Next, the optical-axial focusing adjustment is performed again (S5). This adjustment corrects the defocus produced at (S4).

Figure 8:
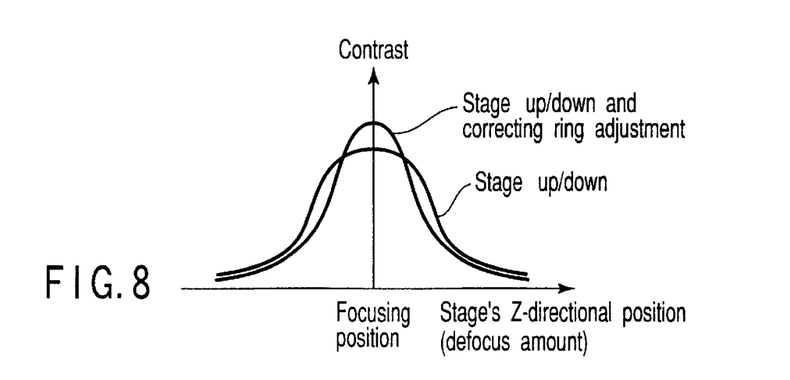
FIG. 8 is a graph for indicating a contrast of an observed image versus a vertical position (Z-directional position) of a stage in the fourth embodiment of the present invention.

Thereafter, the correcting ring adjustment and the optical-axial focusing adjustment are repeated (S6, S7, . . . ). FIG. 8 is a graph for indicating a contrast of an observed image obtained by the optical observation system 533. The horizontal axis indicates the same as that of FIG. 6. A curve "Stage up/down" indicates a contrast obtained when the stage 502 is moved up and down vertically with the correcting ring 506A as unrotated from the initial position, while a curve "stage up/down and correcting-ring adjustment" indicates a contrast obtained when the stage 502 is moved up and down vertically after the correcting ring adjustment and the optical-axial focusing adjustment are repeated as described above.

In both curves, the focusing position is a Z-directional position of the stage 502 which corresponds to a peak value of the contrast. When the correcting ring adjustment and the optical-axial focusing adjustment are repeated, as the step proceeds the shape of the curve "stage up/down and correcting ring adjustment" change and hence the contrast peak value also changes. When the contrast peak value hits the peak, the rotation of the correcting ring and the vertical driving of the stage 502 are stopped (S8).

Thus, the processor section 540 obtains a contrast of an image of the specimen 503 formed on the light-receiving planes 535A and 535B from a light detected by the CCD sensor 535 and, based on this contrast, controls the power focusing unit 501 and the stepping motor 509. As a result, the objective lens 506 focuses on the specimen 503 properly and an aberration of the observed image is also corrected.

Although the fourth embodiment has been described with reference to an example of the erecting microscope, an inverted microscope using a Petri dish or a slide glass may be used to obtain almost the same effects.

The flowchart shown in FIG. 7 may be subject to various changes and modifications. For example, although in the fourth embodiment the correcting ring adjustment and the optical-axial focusing adjustment are repeated up to step (S7), the rotation of the correcting ring 506A and the vertical driving of the stage 502 may be stopped at any one of the steps (S3) through (S7). Moreover, a step of the optical-axial focusing adjustment may be placed between (S1) and (S2).

The Z-directional position z of the stage 502 and the rotation position θ of the correcting ring 506A change from a position (initial position) when (S3) is terminated to a position of (S8) (final position). In the fourth embodiment, the correcting ring adjustment and the optical-axial focusing adjustment are repeated to change z and θ alternately. The method of changing z and θ, however, is not limited to this. For example, z and θ may be changed simultaneously. When they are being changed, the defocus signal calculated from a contrast obtained using the CCD sensor is input to the CPU12A. How to approach the final position from the initial position is not limited to the specific manner.

Although in the fourth embodiment the CPU512A controls, during optical-axial focusing adjustment, the power focusing unit 501 based on the defocus signal calculated by the arithmetic unit 512, the present invention is not limited to this. For example, a memory similar to the memory 109 of the fist embodiment may be provided to the CPU512A. In this case, prior to controlling based on the defocus signal, the CPU512A controls the power focusing unit 501 as in the case of the first embodiment.

In correcting ring adjustment (S4, S6, . . . ), the correcting ring 506A is rotated by a predetermined amount. This rotation amount may be appropriately input by the observer by use of an input section for inputting a rotation amount to the CPU512A. With this, the observer can operate the input section to correct an aberration while looking through the eyepiece lens 533B.

The following will describe a fifth embodiment. Almost all the components of the configuration of the fifth embodiment are basically the same as those of the fourth embodiment. Note here that in the fifth embodiment, the components which are essentially the same as those of the fourth embodiment described with reference to FIG. 5 are indicated by the same reference numerals and so are not described in detail here. The configuration of the fifth embodiment differs from that of the fourth embodiment in that it is not provided with the correcting-ring driver 510 and the stepping motor 509.

A method is described as follows for correcting an error in the thickness of the cover glass 503A. First, on the stage 502 is set the specimen 502 and the cover glass 503A. Next, the observer rotates the correcting ring 506A while looking through the eyepiece lens 533B. During this rotation, the processor section 540 controls the power focusing unit 501 so that the objective lens 506 may properly focus on the specimen 503. As a result, the aberration is corrected to provide proper focusing.

In the microscope according to the fifth embodiment having such a configuration as detailed above, the correcting-ring driver 510 and the stepping motor 509 are omitted, thus rendering that microscope relatively inexpensive.

Figure 9:
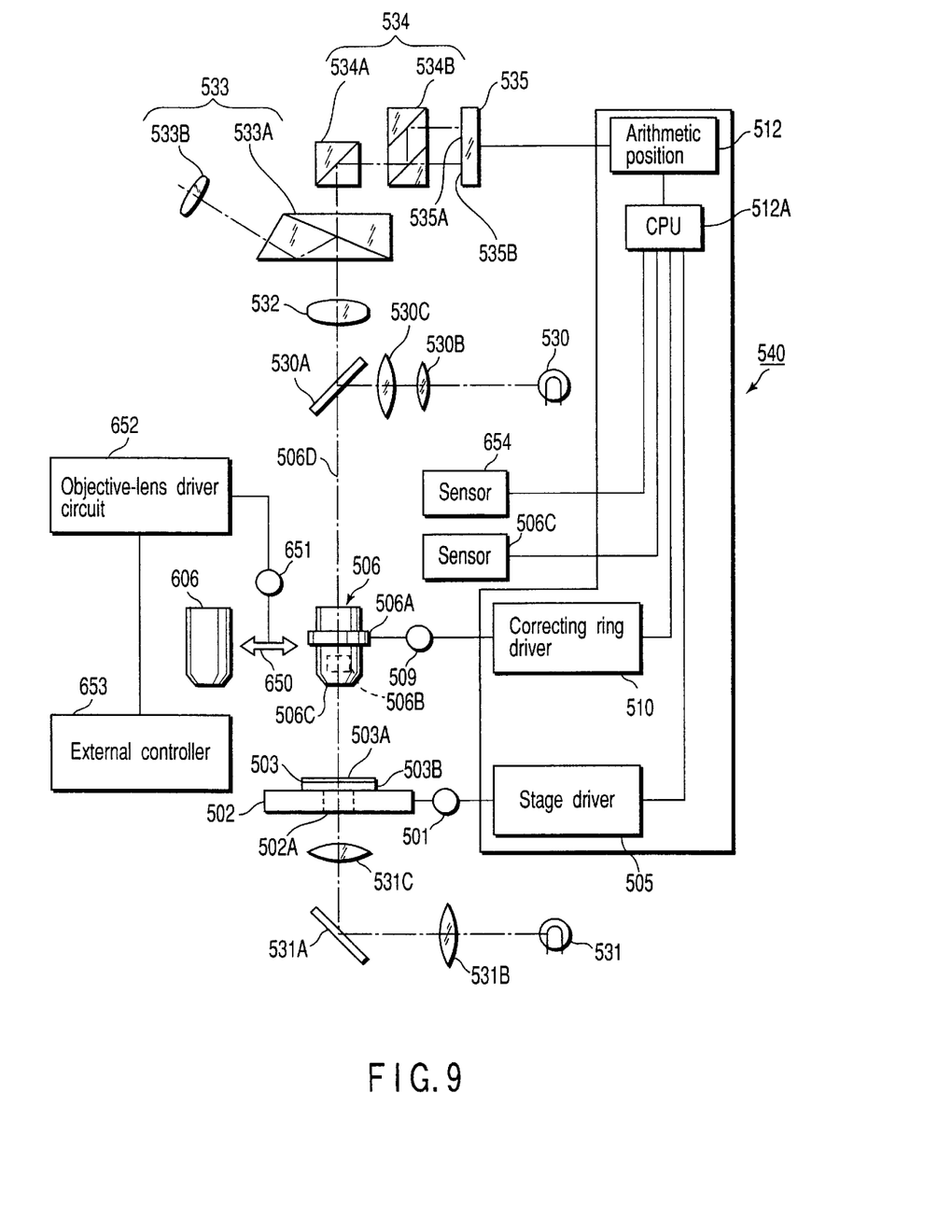
FIG. 9 is an illustration for showing a configuration of an erecting microscope related to a sixth embodiment of the present invention.

The following will describe an erecting microscope related to a sixth embodiment of the present invention. Almost all the parts of the configuration of the sixth embodiment are basically the same as those of the fourth embodiment. Note here that in the sixth embodiment, the components which are essentially the same as those of the fourth embodiment described with reference to FIG. 5 are indicated by the same reference numerals and so are not described in detail. The configuration of the sixth embodiment differs from that of the fourth embodiment in that it is provided with a regular objective lens 606 not having a function of correcting an aberration.

The microscope according to the sixth embodiment further comprises an objective-lens selector mechanism which selectively sets a first state in which the aberration correcting objective lens 506 faces the stage 502 and the regular objective lens 606 is positioned far away from the stage 502 and a second state in which the aberration correcting objective lens 506 is positioned far away from the stage 502 and the regular objective lens 606 faces the stage 502.

This sixth embodiment uses a revolver 650 as the objective-lens selecting mechanism. The revolver 650 is fitted with the objective lenses 606 and 506, either one of which, for example, the objective lens 506, can be positioned on the observation optical path 506D. The revolver 650 can be rotated to thereby position the objective lens 506 far away from the observation optical axis 506D, thus positioning the objective lens 606 on the observation optical axis 506D in place of the objective lens 506.

The revolver 650 is connected to an external controller 653 via a revolver driver section 651 for rotating the revolver 650 and an objective-lens driver circuit 652. The observer can operate the external controller 653 to thereby rotate the revolver 650, thus positioning either one of the objective lenses 506 and 606 on the observation optical axis 506D.

The CPU512A is connected to a sensor 654 detecting whether any one of the objective lenses 506 and 606 is on the observation optical axis 506D and, if the objective lens is on the observation optical axis 506D, outputs a signal detecting which one of these objective lenses 506 and 606 is on the observation optical axis 506D.

The processor section 540, based on the signal sent from the sensor 654, controls the power focusing unit 501 and the stepping motor 509 corresponding to two possible cases. That is, when the regular objective lens 606 is on the observation optical axis 506D, the objective lens 606 is focused with the aberration uncorrected. If the aberration correcting objective lens 506 is on the observation optical axis 506D, on the other hand, the lens is focused with the aberration corrected, as in the case of the fourth embodiment.

Such a configuration can eliminate the step of correcting ring adjustment if the regular objective lens 606 with no function of correcting an aberration is positioned on the observation optical path 506D. Moreover, almost the same effects can be obtained as those of the fourth and fifth embodiments.

Although the sixth embodiment has employed the revolver 650 as the objective-lens selector mechanism, the present invention is not limited to this. For example, such a holder may be provided that holds an objective lens detachably as faced by the stage 502 to thereby attach either one of the objective lenses of 506 and 606, for example, the objective lens 506. The objective lens 506 can be replaced by the objective lens 606 so that the objective lens 606 may face the stage 502 in place of the objective lens 506.

Furthermore, although this sixth embodiment has employed the regular objective lens and the aberration correcting objective lens as many as one each, two or more regular objective lenses may be used. In this case, the objective-lens selector mechanism can permit one of objective lenses to face the stage 502. Moreover, two ore more of aberration correcting objective lenses and the regular objective lenses may be used.

The present invention is not limited to the above embodiments and covers any appropriate variation that falls within the scope without changing the gist thereof. For example, a piezoelectric element etc. may be used in place of the power focusing unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
   an aberration correcting objective lens facing a specimen and having a movable aberration correcting lens correcting an aberration due to an error in a thickness of a cover glass covering said specimen or a specimen-holding member with transmittivity holding said specimen;
   a moving amount detector detecting a moving amount by which said aberration correcting lens moves along an optical axis of the aberration correcting lens;
   a focusing unit changing a distance between said specimen and said aberration correcting objective lens;
   a driver unit driving said focusing unit; and
   an arithmetic unit obtaining a defocus amount of said aberration correcting objective lens based on a moving amount detected by said moving amount detector, wherein said specimen is put out of focus of said aberration correcting objective lens when said aberration correcting lens is moved, and on the basis of a defocus amount obtained by said arithmetic unit, said driver unit drives said focusing unit so that said aberration correcting objective lens focuses on said specimen.

2. A microscope comprising:

an aberration correcting objective lens facing a specimen and having a movable aberration correcting lens correcting an aberration due to an error in a thickness of a cover glass covering said specimen or a specimen-holding member with transmittivity holding said specimen;

a moving unit moving said aberration correcting lens along an optical axis of the aberration correcting lens;

a focusing unit changing a distance between said specimen and said aberration correcting objective lens;

a driver unit driving said focusing unit; and an arithmetic unit obtaining a defocus amount of said aberration correcting objective lens based on a moving amount of said aberration correcting lens moved by said moving unit, wherein said specimen is put out of focus of said aberration correcting objective lens when said aberration correcting lens is moved, and on the basis of a defocus amount obtained by said arithmetic unit, said driver unit drives said focusing unit so that said aberration correcting objective lens focuses on said specimen.

3. A microscope comprising:

a stage placing thereon a specimen covered by a cover glass or held in a specimen-holding member with transmittivity;

an aberration correcting objective lens facing said stage and having an aberration correcting unit correcting an aberration due to an error in a thickness of said cover glass or said specimen-holding member;

a focusing unit changing a distance between said stage and said aberration correcting objective lens;

an optical observation system leading the light from said specimen that has passed through said aberration correcting objective lens, to form an observed image of said specimen; and a processor section controlling said focusing unit so that said aberration correcting objective lens focuses on said specimen, wherein when said aberration correcting unit corrects an aberration, said specimen is put out of focus of said aberration correcting objective lens, and said processor section controls said focusing unit so that said aberration correcting objective lens focuses on said specimen.

4. The microscope according to claim 3, wherein:

said aberration correcting objective lens has an objective lens body, and said aberration correcting unit has an aberration correcting lens movably attached to said objective lens body; and which further comprises:

a moving unit moving said aberration correcting lens;

a photo-detector having a light-receiving plane, detecting a light made incident upon said light-receiving plane; and an optical detecting system leading the light from said specimen that has passed through said aberration correcting objective lens to said light-receiving plane of said photo-detector;

said processor section obtaining a contrast of an image of said specimen formed on said light-receiving plane from light detected by said photo-detector and, based on said contrast, controlling said moving unit and said focusing unit, so that said aberration correcting objective lens focuses on said specimen and that an aberration of said observed image is corrected.

5. The microscope according to claim 3, further comprising:

at least one regular objective lens; and an objective-lens selecting mechanism selectively setting a first state in which said aberration correcting objective lens faces said stage and said regular objective lens is positioned far away from said stage and a second state in which said aberration correcting objective lens is positioned far away from said stage and one of said regular objective lens faces said stage.

* * * * *